(12) United States Patent
Sun et al.

(10) Patent No.: US 7,542,557 B2
(45) Date of Patent: Jun. 2, 2009

(54) DISPLAY ACCURATE INFORMATION WHEN MULTIPLE CONTACTS ARE MATCHED FOR AN INCOMING PHONE NUMBER

(75) Inventors: Ray Sun, Issaquah, WA (US); Peter Eberhardy, Seattle, WA (US); Peter William Wieland, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 932 days.

(21) Appl. No.: 11/144,275

(22) Filed: Jun. 3, 2005

(65) Prior Publication Data

US 2006/0291635 A1  Dec. 28, 2006

(51) Int. Cl.
*H04M 15/06* (2006.01)
*H04M 1/56* (2006.01)

(52) U.S. Cl. .............................. 379/142.06; 379/142.17; 455/415

(58) Field of Classification Search .............. 379/93.17, 379/93.23, 88.19, 88.2, 88.21, 142.01, 142.06, 379/142.019, 142.14, 142.17; 455/415
See application file for complete search history.

(56) References Cited

U.S. PATENT DOCUMENTS

| | | | | |
|---|---|---|---|---|
| 7,336,772 | B1* | 2/2008 | Velusamy | 379/88.17 |
| 2005/0032527 | A1* | 2/2005 | Sheha et al. | 455/456.1 |
| 2005/0281401 | A1* | 12/2005 | Creamer et al. | 379/142.06 |
| 2007/0041550 | A1* | 2/2007 | McLarty et al. | 379/211.02 |
| 2008/0020742 | A1* | 1/2008 | Vander Veen et al. | 455/415 |

* cited by examiner

*Primary Examiner*—Binh K Tieu
(74) *Attorney, Agent, or Firm*—Merchant & Gould PC

(57) ABSTRACT

When multiple contacts are detected for a phone number of an incoming call, a notification that multiple contacts matched the phone number is displayed. When the display area for displaying the notification is adequate to display a full list of the contacts that correspond to the phone number of the incoming call, the full list is displayed. When the display area is inadequate to display the full list, a scrollable list of the multiple contacts is displayed. Alternatively, when the display area is inadequate, a multiple contacts message is displayed that notifies a user that multiple stored contacts matched the phone number of the incoming phone call.

20 Claims, 5 Drawing Sheets

Telephonic Device

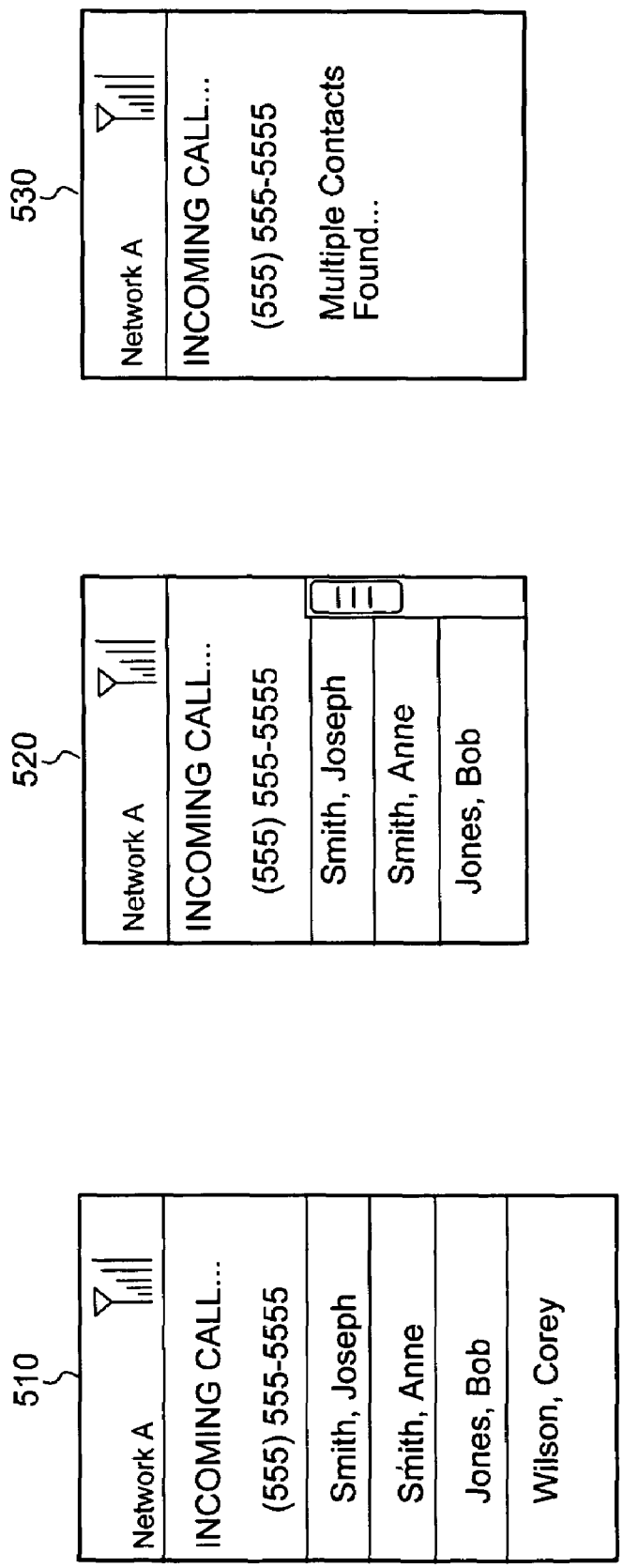

DISPLAY ACCURATE INFORMATION WHEN MULTIPLE CONTACTS ARE MATCHED FOR AN INCOMING PHONE NUMBER

BACKGROUND

Telephonic devices including portable telephone systems, such as cellular phones, have been steadily increasing the type and variety of content that they provide to a user. Many telephonic devices incorporate sufficient computing capabilities to fall within the category of the small, handheld computing devices. Telephonic devices may be known by other names rather than cellular phones and generally refer to devices that have been integrated with receiver/transmitter technology so that they can send and receive telephone calls or other messages via a network. These newly integrated telephonic devices include palmtops, pocket computers, personal digital assistants, personal organizers, H/PCs, and the like. In addition to the sending and receipt of phone calls, these telephonic devices provide many functions to users including word processing, task management, spreadsheet processing, address book functions, Internet browsing, and calendaring, as well as many other functions.

With the addition of these functions to the basic phone call functions, the telephonic devices are now sending and receiving a host of information across a variety of networks. A variety of information is now provided to a user in reference to the information and telephone calls received. Certain telephonic devices are able to match contact information to the phone number associated with an incoming phone call. However, often the information displayed may be incomplete or inaccurate.

SUMMARY

According to aspects of various described embodiments, accurate information is displayed when multiple contacts are matched for an incoming phone number. In certain circumstances, a telephonic device may match more than one contact to an incoming phone number provided by caller ID. In accordance with one aspect of a described embodiment, the telephonic device displays a listing of the multiple contacts that match the incoming phone number when the display space is available. In accordance with another aspect, a text notification or message is displayed to the user that states "multiple contacts found" or a similar notification when the display space is limited. In accordance with another alternate aspect, a scrollbar is added to the listing of matching contacts displayed for the incoming phone number when the display space is limited.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 5 illustrates exemplary displays of different notifications that multiple contacts match the phone number of an incoming call in accordance with the present invention.

DETAILED DESCRIPTION OF ILLUSTRATED EMBODIMENTS

Embodiments of the present invention are described more fully below with reference to the accompanying drawings, which form a part hereof, and which show specific exemplary embodiments for practicing the invention. However, embodiments may be implemented in many different forms and should not be construed as limited to the embodiments set forth herein; rather, these embodiments are provided so that this disclosure will be thorough and complete, and will fully convey the scope of the invention to those skilled in the art. Embodiments of the present invention may be practiced as methods, systems or devices.

The logical operations of the various embodiments of the present invention are implemented (1) as a sequence of computer implemented steps running on a computing system and/or (2) as interconnected machine modules within the computing system. The implementation is a matter of choice dependent on the performance requirements of the computing system implementing the invention. Accordingly, the logical operations making up the embodiments of the present invention described herein are referred to alternatively as operations, steps or modules.

Illustrative Operating Environment

Figure 1:
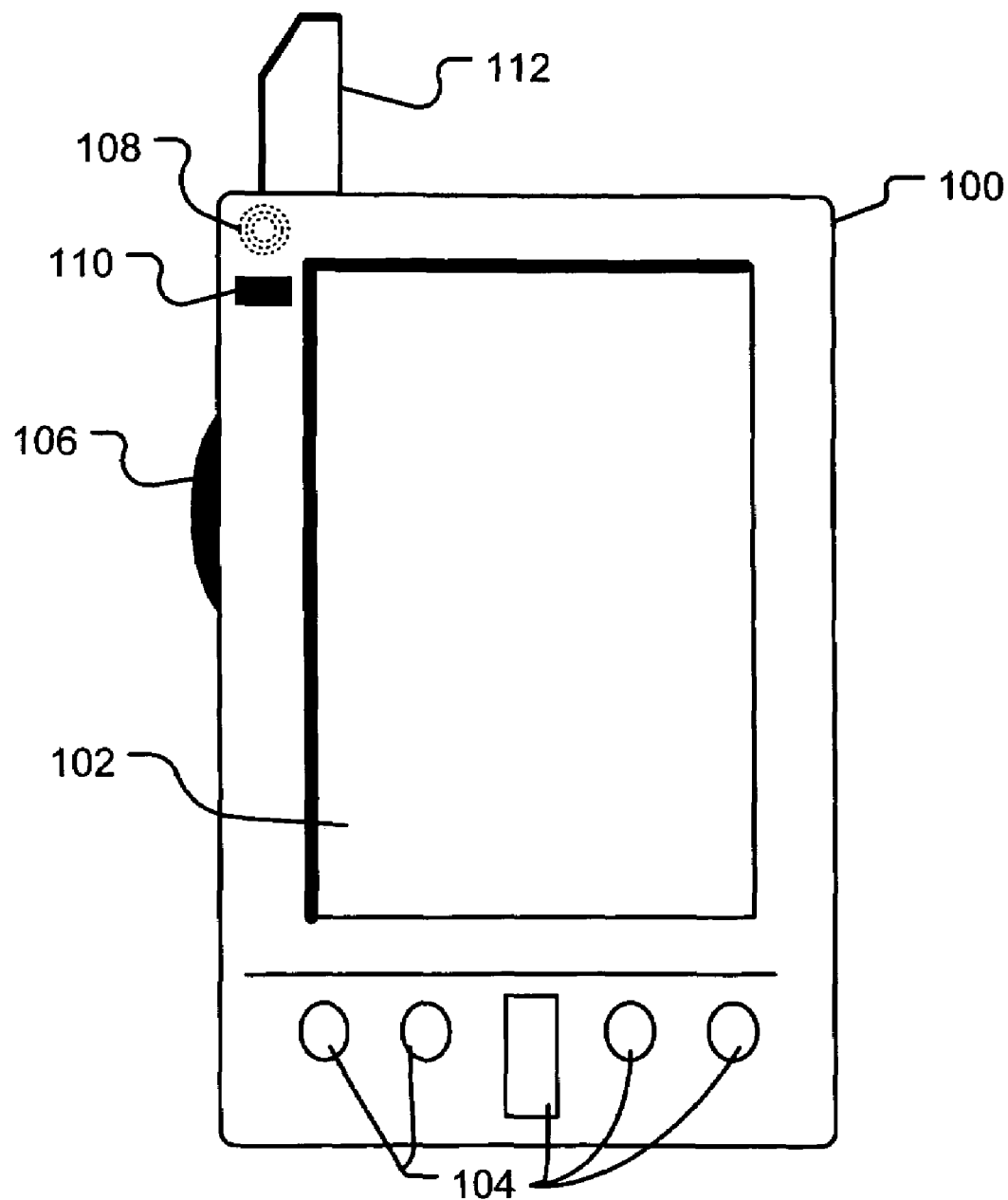
FIG. 1 is a diagram illustrating an exemplary telephonic computing device that may be used according to an exemplary embodiment of the present invention.

FIG. 1 illustrates an embodiment of a telephonic device 100 incorporating aspects of the present invention. In this embodiment, telephonic device 100 is a handheld computer having both input elements and output elements. Input elements may include touch screen display 102 and input buttons or keypad 104 and allow the user to enter information into telephonic computing device 100. Telephonic device 100 also incorporates a side input element 106 allowing further user input. Side input element 106 may be a rotary switch, a button, or any other type of manual input element. In alternative embodiments, telephonic device 100 may incorporate more or less input elements. For example, display 102 may not be a touch screen in some embodiments. In yet another alternative embodiment, telephonic computing device 100 is a portable phone system, such as a cellular phone having display 102 and input buttons or keypad 104.

Telephonic device 100 incorporates output elements, such as display 102, which can display a graphical user interface (GUI). Other output elements include speaker 108 and LED light 110. Additionally, telephonic device 100 may incorporate a vibration module (not shown), which causes telephonic device 100 to vibrate to notify the user of an event. In yet another embodiment, telephonic device 100 may incorporate a headphone jack (not shown) for providing another means of providing output signals.

Telephonic device 100 also incorporates antenna 112 for communication between telephonic device 100 and communication networks or other telephonic devices. For example, antenna 112 may be employed for receiving a telephone call via a cellular network. While the telephone communication may be considered the main form of communication for telephonic device 102, other, alternate communication methods are also available.

Display 102 may be arranged according to a selected display size and resolution that determines the area available for the telephonic device to display data to the user. The area available for display may be also limited to certain display items that take up display space on the telephonic device. For example, certain status indicators (e.g., network type, signal strength, batter life indicator, etc.) may constantly be displayed within the available display area despite the state of the telephonic device. With items constantly being displayed, the area available for other application to display information is further limited.

Although described herein in combination with telephonic device 100, in alternative embodiments the invention is used in combination with any number of computer systems, such as in desktop environments, laptop or notebook computer systems, multiprocessor systems, micro-processor based or programmable consumer electronics, network PCs, mini computers, main frame computers and the like. Additionally, the telephonic device may refer to a device that is separate from the phone itself. For example, one such telephonic device may be a caller ID box that is connected to a landline phone.

Figure 2:
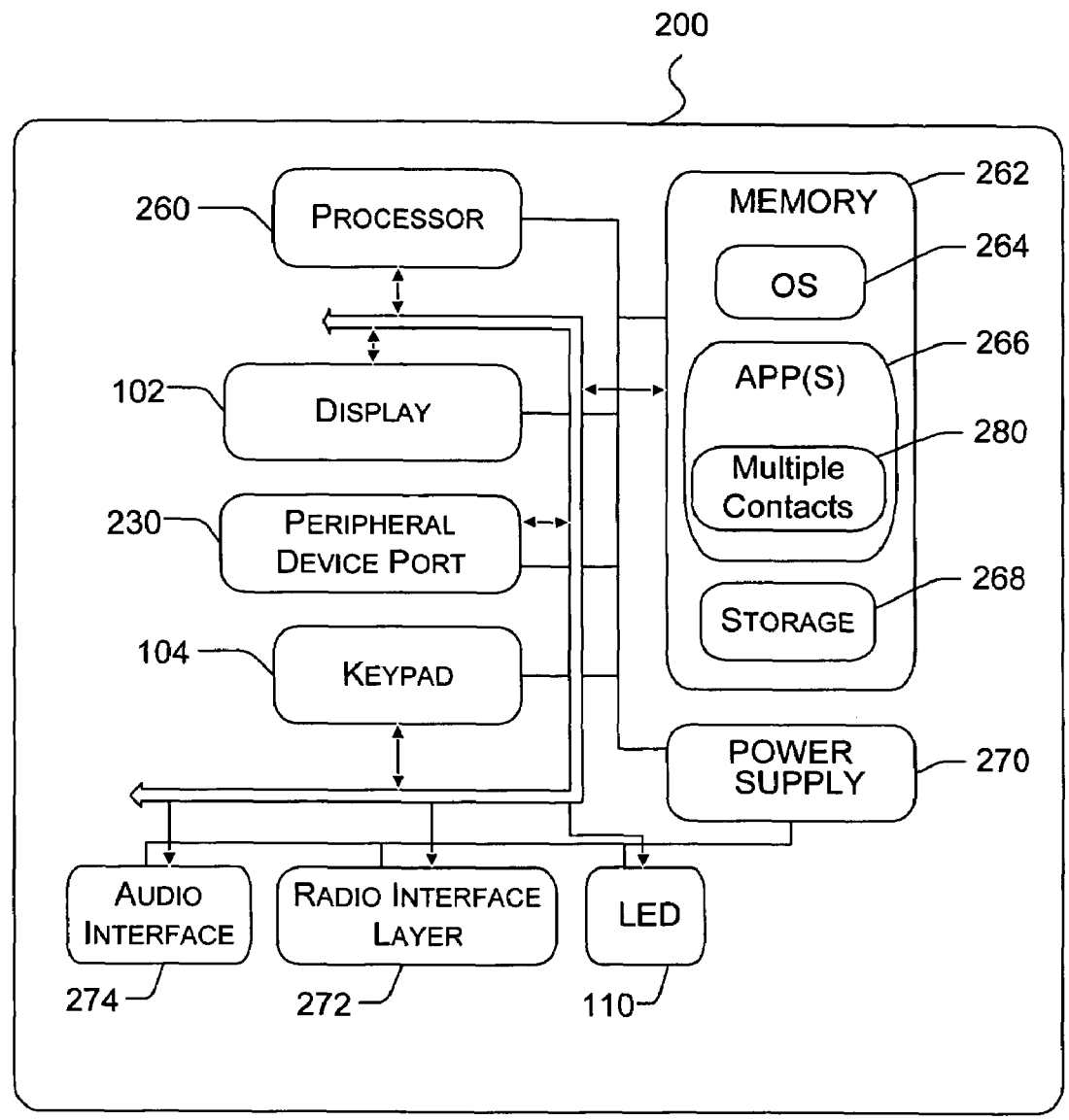
FIG. 2 is a block diagram illustrating components of a telephonic computing device used in an embodiment of the present invention, such as the computer shown in FIG. 1.

FIG. 2 illustrates a system 200 used in an embodiment of the present invention, such as the telephonic device shown in FIG. 1. That is, telephonic device 100 (FIG. 1) can incorporate system 200 to implement an embodiment of the invention. For example, system 200 can be used in implementing a "smart phone" that can run one or more applications similar to those of a desktop or notebook computer such as, for example, browser, email, scheduling, instant messaging, and media player applications. System 200 can execute an OS such as, for example, Windows XP®, Windows Telephonic 2003® or Windows CE® available from Microsoft Corporation, Redmond, Wash. In some embodiments, system 200 is integrated as a computing device, such as an integrated personal digital assistant (PDA) and wireless phone.

In this embodiment, system 200 has a processor 260, a memory 262, display 102, and keypad 104. Memory 262 generally includes both volatile memory (e.g., RAM) and non-volatile memory (e.g., ROM, Flash Memory, or the like). System 200 includes an OS 264, which in this embodiment is resident in a flash memory portion of memory 262 and executes on processor 260. Keypad 104 may be a push button numeric dialing pad (such as on a typical telephone), a multi-key keyboard (such as a conventional keyboard), or may not be included in the telephonic computing device in deference to a touch screen or stylus. Display 102 may be a liquid crystal display, or any other type of display commonly used in telephonic computing devices. Display 102 may be touch-sensitive, and would then also act as an input device.

One or more application programs 266 are loaded into memory 262 and run on operating system 264. Examples of application programs include phone dialer programs, e-mail programs, PIM (personal information management) programs, word processing programs, spreadsheet programs, Internet browser programs, and so forth. System 200 also includes non-volatile storage 268 within memory 262. Non-volatile storage 268 may be used to store persistent information that should not be lost if system 200 is powered down.

Applications 266 may use and store information in non-volatile storage 268, such as e-mail or other messages used by an e-mail application, contact information used by a PIM, documents used by a word processing application, and the like. A synchronization application (not shown) also resides on system 200 and is programmed to interact with a corresponding synchronization application resident on a host computer to keep the information stored in non-volatile storage 268 synchronized with corresponding information stored at the host computer. In some embodiments, non-volatile storage 268 includes the aforementioned flash memory in which the OS (and possibly other software) is stored.

System 200 has a power supply 270, which may be implemented as one or more batteries. Power supply 270 might further include an external power source, such as an AC adapter or a powered docking cradle that supplements or recharges the batteries.

System 200 also includes a radio 272 that performs the function of transmitting and receiving radio frequency communications. Radio 272 facilitates wireless connectivity between system 200 and the "outside world", via a communications carrier or service provider. Transmissions to and from radio 272 are conducted under control of OS 264. In other words, communications received by radio 272 may be disseminated to application programs 266 via OS 264, and vice versa.

This embodiment of system 200 is shown with two types of notification output devices: LED 110 that can be used to provide visual notifications and an audio interface 274 that can be used with speaker 108 (FIG. 1) to provide audio notifications. These devices may be directly coupled to power supply 270 so that when activated, they remain on for a duration dictated by the notification mechanism even though processor 260 and other components might shut down to conserve battery power. LED 110 may be programmed to remain on indefinitely until the user takes action to indicate the powered-on status of the device. Audio interface 274 is used to provide audible signals to and receive audible signals from the user. For example, in addition to being coupled to speaker 108, audio interface 274 may also be coupled to a microphone to receive audible input, such as to facilitate a telephone conversation. In accordance with embodiments of the present invention, the microphone may also serve as an audio sensor to facilitate control of notifications, as will be described below.

In accordance with embodiments of the present invention, applications 266 include a multiple contacts application 280 that is used to provide the functionality of handling multiple contacts matching for an incoming phone call. In one embodiment, multiple contacts application is represented by several software modules included throughout the components of telephonic device 200.

While the above figures and description describe particular embodiments of a telephonic device, it is appreciated that the definition of telephonic device as used throughout this description and the claims is not limited to this example. Instead, a telephonic device is broadly defined as any device capable of sending and receiving a telephone call while sending or receiving alternate data, such as an Internet enabled telephone, a telephonic enabled computing device, a voice-over-IP enabled computing device, or the like.

Illustrative Embodiments for Displaying Accurate Information for Multiple Contacts Matched to a Phone Number Most telephonic devices display the caller ID information (e.g. the phone number) of the incoming caller. In addition, if the phone has an address book or contacts database, many will usually display the person's name and possibly the person's company name. Sometimes, however, the phone number matches more than one contact. A common example includes when two contacts share a home or phone number such as within a family. Another example is when contacts are stored for multiple people at one company and the company exposes a single external phone number. Still another example of having multiple contacts associated with a single phone number occurs when there are duplicate entries for the same person, due to reasons such as synchronization errors when copying contacts from another computing device, user error by creating a double entry accidentally (e.g. the user creates Joe Smith after having Smith, Joseph in the contacts database already), or a user has purposefully created a special duplicate shortcut name for voice recognition dialing. In those cases, current telephonic devices often do not display accurate information. Some telephonic devices display the first contact that's matched. However, the first contact may be wrong for the incoming call. This error may cause the receiver of the call to make a mistake upon answering the call. Other telephonic devices simply display just the phone number, which may confuse the receiver of the call because the receiver normally sees the caller's name.

The present invention solves the shortcomings of previous telephonic devices by providing a telephonic device that displays all contacts that matched to the same phone number when the display area is available and adding a scrollbar when space on the display runs out. On screens with more limited space, another solution provided by the present invention is to display the text "Multiple contacts found" and display the phone number. Each of these display options clearly and accurately conveys to the user of the telephonic device that multiple contacts match the phone number of the incoming call.

Figure 3:
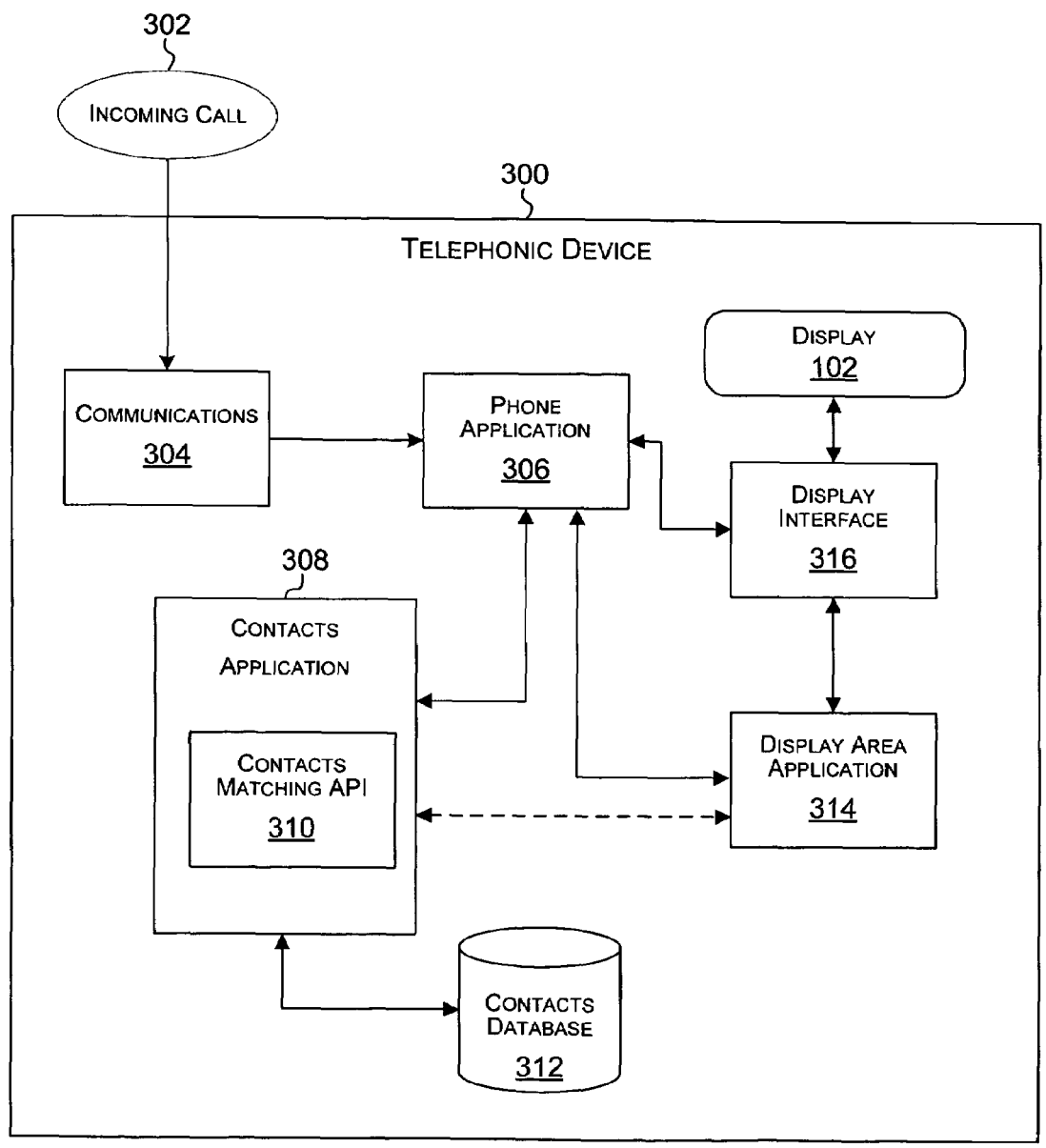
FIG. 3 is a block diagram illustrating a system for displaying accurate information when multiple contacts are matched to a phone number according to an embodiment of the present invention.

FIG. 3 is a block diagram illustrating a system for displaying accurate information when multiple contacts are matched to an incoming phone number according to an embodiment of the present invention. Telephonic device 300 receives incoming call 302 that also includes the caller ID phone number associated with the sender of the phone call. The portions of telephonic device 300 associated with this exemplary embodiment include communications module 304, phone application 306, contacts application 308, contacts database 310, display area application 314, display interface, and display 102. Contacts application 308 further include contacts matching application program interface (API) 310. In one embodiment, display 102 corresponds to display similar to display 102 shown in FIG. 1.

Telephonic device 300 receives incoming call 302 via communication module 304. In one embodiment, communications module 304 corresponds to antenna 112 shown in FIG. 1 along with software and hardware supporting the receipt and transmission of a wireless communication signal. In another embodiment, communications 304 corresponds to software and hardware for receipt and transmission of a wired communication signal. Telephonic and wireless transmissions are well known in the art and are therefore not explained in detail herein. Upon receipt of an incoming phone call, communications module 304 forwards the information received (e.g., caller ID information) to phone application 306.

In the embodiment shown, phone application 306 is arranged to provide the notification to the user that an incoming call is being currently received by telephonic device. Phone application 306 provides instructions to display interface 316 for displaying the notification on display 102. In one example, phone application 306 causes telephonic device to audibly ring and/or vibrate while displaying the phone of the incoming call. Phone application 306 also communicates with contacts application 308 to determine if additional information may be provided in the notification of the incoming call.

Contacts application 308 manages the contacts that the user stores on telephonic device 300. Contacts application 308 includes contacts matching API 310 that takes the phone number associated with the incoming call and determines if the phone number corresponds to any of the contacts stored in contacts database 312. In one embodiment, contacts matching API 310 accesses a lookup table that includes a list of the phone numbers associated with the contacts and associates the phone number with a pointer to the contact information. In another embodiment, contacts matching API 310 performs a search of the contacts in the contact database to determine if any of the phone numbers included in the stored contacts corresponds to the phone number of the incoming call. Search algorithms available for determining the contacts associated the incoming phone number are known and are therefore not described in detail herein. When the search is completed, contacts application may have located more than one contact that matches the phone number associated with the incoming phone call.

When multiple contacts are returned from the operation of contacts matching API 310, contacts application 308 forwards the listing of multiple contacts back to phone application 306. Optionally, in another embodiment, contacts application 308 forwards the listing of multiple contacts or possibly only the number of multiple contacts discovered directly to display area application 314.

Display area application 314 take the list of multiple contacts or the number of multiple contacts and queries display interface 316 whether the display area available for showing the contacts is adequate for displaying the full list of contacts. The display area is adequate when it is large enough to display the full list of contacts that correspond to the phone number of the incoming call. The determination is affected by the instructions provided by phone application 306 to display interface 316 for other items to display (e.g., caller ID information, network status information, etc.). Display area application 314 may need only the number of contacts discovered for the determination if display interface 316 has allocated a set amount of space for contact to be displayed. In this example, the resulting contacts that are displayed are truncated to fit the allocated space. The display area is therefore adequate when the multiple contacts are within a threshold number given the display area available. The determination of whether the display area available is adequate to display the full list of multiple contacts is communicated back to phone application 306.

Phone application 306 takes the determination of the adequacy of the display area available and provides instructions to display interface 316 for how to display the existence of multiple contacts to the user on display 102. If multiple contacts were not found, phone application 306 provides instructions to display the single contact found or may display nothing if no contacts are found. An exemplary process for determining what instructions to give to display interface 316 for displaying the contacts information is described below with reference to FIG. 4.

Figure 4:
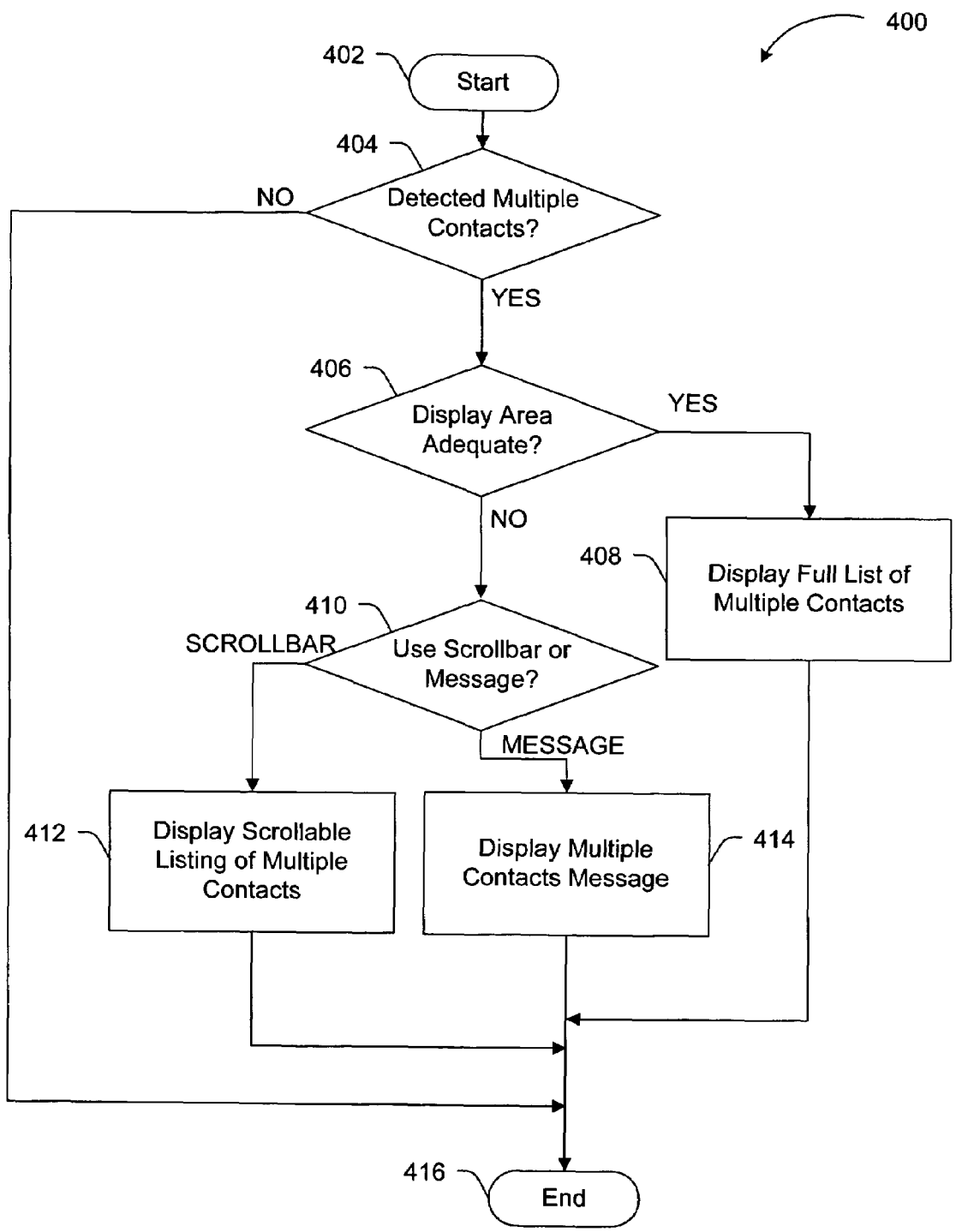
FIG. 4 is a logical flow diagram illustrating an exemplary process for determining the display of multiple contact information according to one embodiment of the present invention.

FIG. 4 is a logical flow diagram illustrating an exemplary process for determining the display of multiple contact information according to one embodiment of the present invention. Process 400 starts at block 402, where the phone number of the incoming call has been identified. Processing continues at decision block 404.

At decision block 404, a determination is made whether multiple contacts were detected when the phone number was cross-referenced with the stored contacts. As stated above with regard to contacts matching API 310 of FIG. 3, more than one method is available to determine if any contacts stored in contacts database 312 corresponds to the phone number associated with the incoming call. If multiple contacts are not detected, processing advances to block 416 where processing can continue for other scenarios that may include detecting a single contact or detecting no matching contacts. If however, multiple contacts are detected, processing continues at decision block 406.

At decision block 406, a determination is made whether the display area available for displaying the contact information is adequate to display the full list of multiple contacts detected. If the display area available is adequate to display the full list, processing moves to block 408.

At block 408, the full list of multiple contacts is displayed on the telephonic device. Turning quickly back to FIG. 3, phone application 306 provides the instructions to display interface 316 to display the full list of contacts on display 102. An example of a display with a full list of the multiple contacts detected is display 510 of FIG. 5. Once the full list of contacts is displayed, processing continues to block 416 where processing moves onto other tasks for the telephonic device.

If however, the display area is inadequate to display the full list of multiple contacts found, processing continues to decision block 410. At block 410, a determination is made of whether to display the list of multiple contacts detected using a scrollbar or to instead display a multiple contacts message. In one embodiment, a pre-selected setting may be accessed by phone application 306 of FIG. 3 to determine which action to take when the display area is inadequate to display the full list of multiple contacts. The pre-selected setting may be set to a user preference. The setting may also be set according to a manufacturer preference when the telephonic device is programmed for initial operation. In one application, using a scrollbar to display the list of multiple contacts within a limited display area is the default option for display of the multiple contacts when the display area available is inadequate to display the full list. In another embodiment, the default option is to display a multiple contacts message. In the present embodiment, if the selection is to display the multiple contacts is by using a scrollbar for the limited space, processing continues to block 412.

At block 412, a scrollable listing is displayed in the limited display area for the multiple contacts that correspond to the phone number of the incoming call. Turning quickly back to the embodiment of FIG. 3, it is phone application 306 that provides the instructions to display interface 316 for displaying the scrollable list of multiple contacts. The scrollable list uses a scrollbar installed in the view of the multiple contacts so that a truncated list of the multiple contacts is included in the view. The user of telephonic device 300 then has the option to use the scrollbar to view the remaining contacts that were not originally displayed. Display 520 of FIGURE is an example of a display with a scrollable list of multiple contacts that correspond to the phone number of the incoming call. Once the scrollable list of the multiple contacts detected is displayed, processing continues at block 416 where processing moves onto other tasks for the telephonic device.

If instead, the pre-selected setting is set to display the multiple contacts message, processing continues at block 414. At block 414, a multiple contacts message is displayed on the telephonic device to indicate that multiple contacts were found that correspond to the phone number of the incoming call. Turning quickly to the embodiment of FIG. 3, phone application 306 provides display interface 316 instructions for displaying a multiple contacts message on display 102. The multiple contacts message may simply state "multiple contacts found" or a similar message that notifies the user of telephonic device 300 that more than one stored contact matches the phone number of the incoming call. Display 530 of FIG. 5 shows an example of a telephonic device screen with multiple contacts message. Once the multiple contacts message is displayed, processing continues to block 416, where processing moves onto other tasks for the telephonic device.

Process 400 may be interrupted at any time due to other telephonic device processes that may occur. For example, the call may be ended, or the user may have selected to send the call to voicemail. Additionally, a selection may be made to automatically display the multiple contacts message despite the display area available. By displaying an indication that multiple contacts matched the phone number of the incoming call, the present invention prevents inaccurate information from being displayed to the user corresponding to the call.

In another embodiment, process 400 is adjusted to display multiple contacts as the contacts are discovered. As the contacts are discovered that match the phone number of the incoming call, the contact information is forwarded to phone application. The phone application forwards instructions to the display interface to display the contact information as it is received. When the number of contacts increases such that the contacts can no longer be displayed in the available display area, the scrollbar is then added to the display. Alternatively, the multiple contacts message is displayed when the display area is no longer adequate.

FIG. 5 illustrates exemplary displays of different notifications that multiple contacts match the phone number of an incoming call in accordance with the present invention. Displays 510, 520, and 530 are each different displays. Display 510 shows full list of multiple contacts that corresponds to the incoming phone number. Display 520 shows an example of a scrollable list of multiple contacts. Display 530 shows an example of a multiple contacts message. Other formats for notification that multiple contacts match the phone number of the incoming call may also be used without departing from the spirit or scope of the invention.

Although the invention has been described in language that is specific to structural features and/or methodological steps, it is to be understood that the invention defined in the appended claims is not necessarily limited to the specific features or steps described. Rather, the specific features and steps are disclosed as forms of implementing the claimed invention. Since many embodiments of the invention can be made without departing from the spirit and scope of the invention, the invention resides in the claims hereinafter appended.

What is claimed is:

1. A method for displaying accurate contact information when multiple contacts are matched to a phone number of an incoming call, the method comprising:
   determining whether a telephonic device is capable of displaying the multiple contacts; and
   displaying a notification indicating that multiple contacts matched the phone number, wherein the notification displayed depends on the capability of the telephonic device to display the multiple contacts and the notification corresponds to one of a group comprising: a full list of the multiple contacts, a scrollable list of the multiple contacts, and a multiple contact message.

2. The method of claim 1, wherein determining whether the telephonic device is capable of displaying the multiple contacts further comprises determining the available display area of the telephonic device for displaying contact information.

3. The method of claim 2, wherein the telephonic device is capable of displaying the multiple contacts when the display area is adequate to display the full list of multiple contacts that correspond to the phone number of the incoming call.

4. The method of claim 2, wherein the notification displayed corresponds to the full list of the multiple contacts when the display area is adequate to display the full list of multiple contacts that correspond to the phone number of the incoming call.

5. The method of claim 2, wherein the display area is adequate when the multiple contacts are within a threshold number given the display area available.

6. The method of claim 2, wherein the notification displayed corresponds to at least one of the scrollable list of the multiple contacts and the multiple contacts message when the display area is inadequate to display the full list of multiple contacts that correspond to the phone number of the incoming call.

7. The method of claim 6, wherein the notification displayed when the display area is inadequate to display the full list of multiple contacts that correspond to the phone number of the incoming call is dependent on a pre-selected setting that determines which of the scrollable list of multiple contacts and the multiple contacts massage to display.

8. A computer-readable medium having stored thereon instructions that when executed implements the method of claim 1.

9. A telephonic device comprising:
a communication module for receiving an incoming call;
a contacts application that is arranged to determine when contacts stored on the telephonic device match a phone number corresponding to the incoming call;
a display; and
an application that includes computer-executable instructions for displaying accurate information when multiple contacts are matched to a phone number of an incoming call, the computer-executable instructions comprising:
determining whether a display area is adequate for displaying a full list of the multiple contacts matched to the phone number,
displaying the full list of multiple contacts when the display area is adequate for displaying the full list of the multiple contacts,
determining whether a pre-selected setting is chosen for displaying the multiple contacts when the display area is inadequate, and
displaying at least one of a scrollable list of multiple contacts and a multiple contacts message when the display area is inadequate, wherein the scrollable list of multiple contacts is displayed when the pre-selected setting corresponds to a first selection and the multiple contacts message is displayed when the pre-selected setting corresponds to a second selection.

10. The telephonic device of claim 9, wherein the contacts application further comprises a contact matching API that is configured to search the stored contacts and determine which of the stored contacts includes the phone number of the incoming call.

11. The telephonic device of claim 9, wherein the stored contacts are stored within a contacts database.

12. The telephonic device of claim 9, further comprising a display area application that is arranged to determine the available display area for displaying contact information.

13. The telephonic device of claim 9, wherein displaying the full list of multiple contacts corresponds to providing instructions to a display interface to display the full list of multiple contacts.

14. The telephonic device of claim 9, wherein displaying the scrollable list of multiple contacts corresponds to providing instructions to a display interface to display the scrollable list of multiple contacts when the pre-selected setting corresponds to the first selection.

15. The telephonic device of claim 9, wherein displaying the multiple contacts message corresponds to providing instructions to a display interface to display the multiple contacts message when the pre-selected setting corresponds to the second selection.

16. A computer-readable medium having stored thereon the computer-executable instructions of claim 9, wherein the computer-readable medium is arranged so that the computer-executable instructions are executable on the telephonic device.

17. A system comprising:
means for determining when contacts stored on a telephonic device match a phone number corresponding to the incoming call;
means for determining whether a display area is adequate for displaying a full list of the multiple contacts matched to the phone number,
means for displaying the full list of multiple contacts when the display area is adequate for displaying the full list of the multiple contacts,
means for determining whether a pre-selected setting is chosen for displaying the multiple contacts when the display area is inadequate, and
the means for displaying further arranged to display at least one of a scrollable list of multiple contacts and a multiple contacts message when the display area is inadequate, wherein the scrollable list of multiple contacts is displayed when the pre-selected setting corresponds to a first selection and the multiple contacts message is displayed when the pre-selected setting corresponds to a second selection.

18. The system of claim 17, further comprising means for determining the available display area for displaying contact information.

19. The system of claim 17, wherein the means for determining when contacts stored on a telephonic device match a phone number corresponding to the incoming call further comprises means for searching stored contacts and determining which of the stored contacts includes the phone number of the incoming call.

20. A computer-readable medium having stored thereon instructions that when executed implements the system of claim 17.

* * * * *